United States Patent [19]

Cowan et al.

[11] Patent Number: 5,343,951
[45] Date of Patent: Sep. 6, 1994

[54] DRILLING AND CEMENTING SLIM HOLE WELLS

[75] Inventors: Kenneth M. Cowan, Sugar Land; Arthur H. Hale, Houston, both of Tex.

[73] Assignee: Shell Oil Company, Houston, Tex.

[21] Appl. No.: 964,991

[22] Filed: Oct. 22, 1992

[51] Int. Cl.⁵ ...................... E21B 21/00; E21B 33/14; C09K 7/02
[52] U.S. Cl. .................................. 166/293; 166/292; 166/300; 175/65; 507/140
[58] Field of Search .................. 175/64, 65; 507/140; 166/292, 293, 300

[56] References Cited

U.S. PATENT DOCUMENTS

| | | |
|---|---|---|
| 2,336,723 | 12/1943 | Drummond . |
| 2,649,160 | 8/1953 | Williams et al. . |
| 2,822,873 | 2/1958 | Harmsen et al. . |
| 2,880,096 | 3/1959 | Hurley . |
| 2,895,301 | 7/1959 | Casagrande et al. . |
| 2,899,329 | 8/1959 | Lyons . |
| 2,938,353 | 5/1960 | Vorenkamp . |
| 2,961,044 | 11/1960 | Shell . |
| 3,021,680 | 2/1962 | Hayward . |
| 3,077,740 | 2/1963 | Hemwall . |
| 3,111,006 | 11/1963 | Caron . |
| 3,168,139 | 2/1965 | Kennedy et al. . |
| 3,412,564 | 11/1968 | McClintock . |
| 3,499,491 | 3/1970 | Wyant et al. . |
| 3,557,876 | 1/1971 | Tragesser . |
| 3,670,832 | 6/1972 | Striegler . |
| 3,675,728 | 7/1972 | Faulk et al. . |
| 3,695,355 | 10/1972 | Wood et al. .................. 166/295 |
| 3,712,393 | 1/1973 | Sheldahl et al. . |
| 3,724,562 | 4/1973 | Striegler . |
| 3,820,611 | 6/1974 | King . |
| 3,835,939 | 9/1974 | McEntire . |
| 3,887,009 | 6/1975 | Miller et al. . |
| 3,962,878 | 6/1976 | Hansen . |
| 3,964,921 | 6/1976 | Persinski et al. . |
| 4,014,174 | 3/1977 | Mondshine . |
| 4,037,424 | 7/1977 | Anders . |
| 4,057,116 | 11/1977 | Striegler . |
| 4,215,952 | 8/1980 | Baardsen . |
| 4,252,471 | 2/1981 | Straub . |
| 4,335,980 | 6/1982 | DePriester . |
| 4,338,134 | 7/1982 | Graf zu Munster . |
| 4,425,055 | 1/1984 | Tiedemann . |
| 4,427,320 | 1/1984 | Bhula . |
| 4,450,009 | 5/1984 | Childs et al. . |
| 4,460,292 | 7/1984 | Durham et al. . |
| 4,518,508 | 5/1985 | Conner ........................ 210/751 |
| 4,643,617 | 2/1987 | Kanno et al. ................ 405/222 |
| 4,664,843 | 5/1987 | Burba, III et al. . |
| 4,668,128 | 5/1987 | Hartley et al. . |
| 4,674,574 | 6/1987 | Savoly et al. ................ 166/293 |
| 4,690,589 | 9/1987 | Owa ............................ 405/263 |
| 4,692,065 | 9/1987 | Suzuki et al. ................ 405/211 |
| 4,720,214 | 1/1988 | Brasted et al. . |
| 4,746,245 | 5/1988 | Mork ........................... 405/224 |
| 4,760,882 | 8/1988 | Novak . |
| 4,761,183 | 8/1988 | Clarke . |
| 4,790,954 | 12/1988 | Burba, III et al. . |
| 4,880,468 | 11/1989 | Bowlin et al. . |
| 4,897,119 | 1/1990 | Clarke . |

(List continued on next page.)

FOREIGN PATENT DOCUMENTS 85-144069/24 10/1983 Japan .
61-48454 3/1986 Japan .
833704 6/1981 U.S.S.R. .

OTHER PUBLICATIONS

"Deep Cement Mixing Experience in Japan", by G. Dennis et al., Copyright 1985 Seabed Strengthening Symposium, Denver, Colo., Jun. 4, 1985, TP 85-5.

(List continued on next page.)

Primary Examiner—George A. Suchfield

[57] ABSTRACT

A slim hole well is drilled using a drilling fluid comprising blast furnace slag and water which drilling fluid is circulated during the drilling to lay down a filter cake. Thereafter, an activator is added and generally, an alkaline material and additional blast furnace slag, to produce a cementitious slurry which is passed down a casing and up into an annulus to effect primary cementing.

17 Claims, No Drawings

U.S. PATENT DOCUMENTS

| | | |
|---|---|---|
| 4,913,585 | 4/1990 | Thompson et al. . |
| 4,942,929 | 7/1990 | Malachosky et al. . |
| 4,991,668 | 2/1991 | Rehm et al. . |
| 5,016,711 | 5/1991 | Cowan . |
| 5,020,598 | 6/1991 | Cowan et al. ............ 166/293 |
| 5,026,215 | 6/1991 | Clarke . |
| 5,058,679 | 10/1991 | Hale et al. . |
| 5,082,499 | 1/1992 | Shen ............ 106/735 |
| 5,086,850 | 2/1992 | Harris et al. . |
| 5,105,885 | 4/1992 | Bray et al. . |
| 5,106,423 | 4/1992 | Clarke . |
| 5,121,795 | 6/1992 | Ewert et al. . |
| 5,123,487 | 6/1992 | Harris et al. . |
| 5,125,455 | 6/1992 | Harris et al. . |
| 5,127,473 | 7/1992 | Harris et al. . |
| 5,133,806 | 7/1992 | Sakamoto et al. ............ 106/811 |
| 5,147,565 | 9/1992 | Bour et al. ............ 252/8.551 |

OTHER PUBLICATIONS

"Mud Disposal: An Industry Perspective", Hanson et al., Drilling, May 1986, pp. 16–21.

"Waste Minimization Program Can Reduce Drilling Costs", Hall et al., Oryx Energy Co., Houston, Tex., Oil & Gas Journal, Jul. 1, 1991, pp. 43–46.

"Phosphoric Acids and Phosphates", Kirk–Othmer Enc. of Chemical Technology, 3rd Ed., vol. 17, p. 477.

"Conversion of Drilling Fluids to Cements with Blast Furnace Slag-Performance Properties and Applications for Well Cementing", SPE Paper 24575, (Oct. 4, 1992), by Cowan et al.

"Quantitative Interpretation of X-Ray Diffraction Patterns of Mixtures. I. Matrix–Flushing Method for Quantitative Multicomponent Analysis", by Frank H. Chung, J. Appl. Cryst., (1974), 7, pp. 519–525.

DRILLING AND CEMENTING SLIM HOLE WELLS

BACKGROUND OF THE INVENTION

This invention relates to drilling and cementing slim hole boreholes.

Boreholes for applications such as oil wells are normally drilled with an initial diameter of about 20 inches. It has long been known to drill smaller diameter holes, known as slim holes, for exploratory wells. These wells generally have a borehole of no more than 5-6 inches initial diameter. It would be desirable to drill slim hole production wells in some instances.

As with the drilling of conventional boreholes, the slim hole process is generally carried out using a rotary drilling process. The rotary drilling of a borehole is accomplished by rotating a drill string having a drill pipe and a drill bit at its lower end. Weight is applied to the drill string while rotating to create a borehole into the earth. The drill string is hollow and sections are added to drill string to increase its length as the borehole is deepened. This rotary drilling process creates significant amounts of friction which produces heat along with fragments of the strata being penetrated. The fragments of the strata must be removed from the borehole and the drill bit must be cooled to extend its useful life. Both of these necessities are accomplished by the circulation of a fluid down through the drill string and up to the surface between the drill string and the wall of the borehole. As this done, a layer of solids is deposited on the borehole wall which is commonly referred to as filter cake. The filter cake is formed by the combination of solids in the drilling fluid and the differential between the fluid pressure in the borehole and the formations being penetrated. Since the pressure exerted by the fluid column in the borehole is preferably slightly to significantly higher than the pressure in the pores of the exposed formation, there is a tendency for the liquid phase of the drilling fluid to leak off into the formation. As this occurs, the solids are deposited along the borehole wall since they are typically of sufficient size to prevent substantial penetration into the formation.

Once the borehole has been drilled to the desired depth, it may be desirable to isolate the separate areas, zones or formations transversed by the borehole. For extraction of fluids from formations, a conduit (casing) must be inserted into the borehole extending from the surface downward.

At this point it becomes necessary to fill the annulus between the casing and the borehole wall with a material which will seal the annulus and provide structural support for the casing. This is commonly referred to as primary cementing.

Slim hole drilling creates two problems. First, it is more difficult to remove the fluid in the annulus between the borehole and casing because the annulus is smaller. Second, it is more difficult to remove the filter cake on the side of the borehole wall, again because the annulus is so narrow. This latter problem is significant because the filter cake is generally incompatible with the cement. This can result in channeling of fluids used to wash out the drilling fluid and/or channeling of the cement leaving significant areas of unremoved and incompatible drilling fluid in the annulus. This results in voids in the final cementing job.

It has long been known to use pozzolans which broadly encompass, inter alia, slag as cementitious materials, as shown in Tragesser, U.S. Pat. No. 3,557,876 (Jan. 26, 1971).

SUMMARY OF THE INVENTION

It is an object of this invention to cement a slim hole well.

It is a further object of this invention to avoid the formation of voids in a cementing job in a slim hole well.

It is a further object of this invention to avoid the problems of incompatibility between filter cake and cement in the annulus of a slim hole well.

In accordance with this invention a slim hole borehole is drilled utilizing a drilling fluid comprising blast furnace slag and water, the drilling fluid being circulated down a drill string and up an annulus between the drill string and the borehole wall, thus laying down a filter cake on the walls of the borehole during the drilling; thereafter the drill string is removed, casing inserted and an activator is added to the drilling fluid and the resulting cementitious slurry is circulated down into the casing and up into the annulus.

DETAILED DESCRIPTION OF THE INVENTION

It has been discovered that by utilizing blast furnace slag in the drilling fluid, a compatible filter cake is laid down on the borehole wall and thus the filter cake turns into an asset rather than a liability. In addition, as will be discussed in detail hereinbelow, undisplaced drilling fluid in the narrow annulus is converted into a strong, hard, sealing material.

In preferred embodiments wherein the drilling fluid is activated by additional blast furnace slag and accelerators, as will be discussed hereinbelow, the rheological properties of both the drilling fluid and the cement can be optimized. Finally, the drilling fluid and cement produced in accordance with this invention is tolerant, indeed is benefitted by, the presence of brine. Since a major area where slim hole wells are utilized is in offshore drilling where brine is inevitably present this is of special significance. Since drilling fluid used in accordance with this invention becomes a part of the final cement, the fluid can be referred to as a universal fluid, i.e., is useful in the drilling and cementing.

The term 'slim hole drilling' is intended to encompass those techniques where the initial borehole diameter is 3 to 9 inches, more generally 4 to 6 inches. In such wells the annulus is only 0.1 to 1.5; generally 0.25 to 1.25, more generally 0.5 to 0.75 inches. Reference to the dimension of the annulus means the difference between the radius to the inner surface of the borehole and the radius to the outer surface of the casing.

DRILLING FLUID

The term 'drilling fluid' as used herein means water or oil based fluids which contain water, blast furnace slag and at least one other additive such as viscosifiers, thinners, dissolved salts, solids from the drilled formations, solid weighting agents to increase the fluid density, formation stabilizers to inhibit deleterious interaction between the drilling fluid and geologic formations, and additives to improve the lubricity of the drilling fluid.

Generally, the initial drilling fluid will be any one of the known types of drilling fluids which has been combined with blast furnace slag. Suitable drilling fluids include those known in the art as water-based muds, fresh water mud, sea water mud, salt mud, brine mud, lime mud, gypsum mud, polyalcohol mud and oil-in-water emulsions. Also, oil-containing muds which also contain water can be utilized such as low water content oil-base mud and invert oil-emulsion mud. One group of suitable drilling fluids is disclosed in Hale and Cowan, U.S. Pat. No. 5,058,679 (Oct. 22, 1991), the disclosure of which is incorporated herein by reference. In all cases the mud will also have blast furnace slag which will generally be present in an amount within the range of 1 to 100 lbs/bbl of final drilling fluid, preferably 10 to 80 lbs/bbl, most preferably 20 to 50 lbs/bbl.

A typical mud formulation to which slag may be added to form drilling fluid is as follows: 10–20 wt % salt based on total fluid weight, 8–10 lbs/bbl bentonite, 4–6 lbs/bbl carboxymethyl starch (fluid loss preventor), sold under the trade name "BIOLOSE" by Milpark, 0.5–1 lbs/bbl partially hydrolyzed polyacrylamide (PHPA) which is a shale stabilizer, sold under the trade name "NEWDRIL" by Milpark, 1–1.25 lbs/bbl carboxy methyl cellulose (CMC) sold under the trade name "MILPAC" by Milpark, 30–70 lbs/bbl drill solids, and 0–250 lbs/bbl barite.

Because the drilling fluid becomes a part of the final cementitious slurry, the amount of used drilling fluid which must be disposed of is greatly diminished.

As noted hereinabove, both fresh and salt water muds can be utilized. There is, however, a preference for drilling fluids containing 0.1 to 26 wt %, most preferably 3 to 10 wt % sodium chloride. One suitable source for this is simply to use sea water or a brine solution simulating sea water. Contrary to what would be expected, the brine actually enhances the final strength of the cement.

Various salts, preferably inorganic salts, are suitable for use in the drilling fluid used in this invention including, but not limited to, NaCl, NaBr, KCl, CaCl$_2$, NanO$_3$, NaC$_2$H$_3$O$_2$, KC$_2$H$_4$O$_2$, NaCHO$_2$, and KCHO$_2$ among which sodium chloride is preferred, as noted above. Broadly, such salts can be used, if desired up to the saturation point under the conditions employed.

In another embodiment of this invention, most or all of the components of the drilling fluid are chosen such that they have a function in the cementitious material also. The following Table illustrates the uniqueness of such formulations.

TABLE A

| | Function | | | |
|---|---|---|---|---|
| | Drilling Fluid | | Cementitious Slurry | |
| Additive | Primary | Secondary | Primary | Secondary |
| Synthetic polymer[1] | Fluid loss control | | Fluid loss control | Retarder |
| Starch[2] | Fluid loss control | Viscosity | Fluid loss control | Retarder |
| Biopolymer[3] | Viscosity | | Viscosity | Retarder |
| Silicate | Viscosity | Shale stabilizer | Accelerator | — |
| Carbohydrate polymer[4] | Deflocculant | — | Retarder | Deflocculant |
| Barite[5] | Density | | Density | Solids |
| Bentonite[6] | Fluid loss control | — | Fluid loss control | Solids |
| Clay/Quartz dust[7] | — | — | Solids | — |
| Slag[8] | Cuttings | | Cementitious | Solids |

TABLE A-continued

| | Function | | | |
|---|---|---|---|---|
| | Drilling Fluid | | Cementitious Slurry | |
| Additive | Primary | Secondary | Primary | Secondary |
| Lime[9] | stabilizer Cuttings/wellbore stabilizer | Alkalinity | Accelerator | Solids |
| PECP[10] polyalcohol | Shale stabilizer | Fluid loss | Retarder | Rheological control |
| NaCl | Shale stabilizer | — | — | — |

[1]A synthetic polymer manufactured by SKW Chemicals Inc. under trade name "POLYDRILL", for instance.
[2]Starch made by Milpark Inc. under the trade name "PERMALOSE", for instance.
[3]"BIOZAN", a biopolymer made by Kelco Oil Field Group, Inc., for instance.
[4]A water-soluble carbohydrate polymer manufactured by Grain Processing Co. under trade name "MOR-REX", for instance.
[5]Barite is BaSO$_4$, a drilling fluid weighting agent.
[6]Bentonite is clay or colloidal clay thickening agent.
[7]A clay/quartz solid dust manufactured by MilWhite Corp. under the trade name "REVDUST", for instance.
[8]Blast furnace slag manufactured by Blue Circle Cement Co. under the trade name "NEWCEM" is suitable.
[9]CaO
[10]Polycyclicpolyetherpolyol The material in the above Table A labeled PECP is of special significance in connection with this invention. This refers to a polyhydric alcohol most preferably a polycyclicpolyetherpolyol. A general chemical composition formula representative of one class of these materials is as follows:

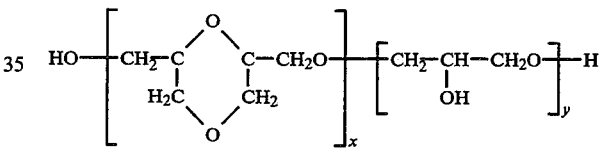

where $x \geq 1$ and $y \geq 0$.

A more complete description of these polycyclicpolyetherpolyols is found in Hale and Cowan, U.S. Pat. No. 5,058,679 (Oct. 22, 1991), the disclosure of which is incorporated herein by reference.

SLAG

By 'blast furnace slag' is meant the hydraulic refuse from the melting of metals or reduction of ores in a furnace as disclosed in said Hale and Cowan, U.S. Pat. No. 5,058,679 (Oct. 22, 1991), the disclosure of which is incorporated herein by reference.

The preferred blast furnace slag used in this invention is a high glass content slag produced by quickly quenching a molten stream of slag at a temperature of between 1,400° C. and 1,600° C. through intimate contact with large volumes of water to convert the stream into a material in a glassy state having hydraulic properties. At this stage it is generally a granular material that can be easily ground to the desired degree of fineness. Silicon dioxides, aluminum oxides, iron oxides, calcium oxide, magnesium oxide, sodium oxide, potassium oxide, and sulphur are some of the chemical components in slags. Preferably, the blast furnace slag used in this invention has a particle size such that it exhibits a Blaine specific surface area between 2,000 cm$^2$/g and 15,000 cm$^2$/g and more preferably between 3,000 cm$^2$/g and 15,000 cm$^2$/g, even more preferably, between 4,000 cm$^2$/g and 9,000 cm$^2$/g, most preferably between 4,000 cm$^2$/g and 8,500 cm$^2$/g. An available blast furnace slag which fulfills these requirements is marketed under the trade name "NEWCEM" by the Blue Circle Atlantic Company. This slag is obtained from the Bethlehem Steel Corporation blast furnace at Sparrow's Point, Md.

A usual blast furnace slag composition range in weight percent is: SiO$_2$, 30-40; Al$_2$O$_3$, 8-18; CaO, 35-50; MgO, 0-15; iron oxides, 0-1; S, 0-2 and manganese oxides, 0-2. A typical example is: SiO$_2$, 36.4; Al$_2$O$_3$, 16.0; CaO, 43.3; MgO, 3.5; iron oxides, 0.3; S, 0.5; and MnO$_2$O$_3$<0.1.

Blast furnace slag having relatively small particle size is frequently desirable because of the greater strength it imparts in many instances to a final cement. Characterized in terms of particle size the term "fine" can be used to describe particles in the range of 4,000 to 7,000 cm$^2$/g. Corresponding to 16 to 31 microns in size; "microfine" can be used to describe those particles in the 7,000 to 10,000 cm$^2$/g range that correspond to particles of 5.5-16 microns in size and "ultrafine" can be used to describe particles over 10,000 cm$^2$/g that correspond to particles 5.5 microns and smaller in size. In each instance, the surface area is Blaine specific surface area. Finely ground blast furnace slag is available from Blue Circle Cement Company under the trade name "NEWCEM", from Geochem under the trade name "MICROFINE MC-100" and from Koch Industries of Tulsa, Okla. under the trade name "WELL-CEM". The Koch product has a Blaine specific surface area of 10,040 cm$^2$/gm.

However, it is very time consuming to grind blast furnace slag to these particle sizes. It is not possible to grind blast furnace slag in a manner where particles are entirely one size. Thus, any grinding operation will give a polydispersed particle size distribution. A plot of particle size versus percent of particles having that size would thus give a curve showing the particle size distribution.

In accordance with a preferred embodiment of this invention a blast furnace slag having a polydispersed particle size distribution exhibiting at least two nodes on a plot of particle size versus percent of particles in that size is utilized. It has been found that if only a portion of the particles are in the ultrafine category, the remaining, indeed the majority, of the slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25 wt % would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with the less severe conditions there would be some particles within the microfine or ultrafine range. Thus, only a minority, i.e., as little as 4 wt % of the slag, would need to be ground to the ultrafine particle size. Generally, 5 to 20%, more preferably 5 to 8% can be ground to the ultrafine particle size; the remainder can be ground in a normal way, thus giving particles generally in a size range of greater than 11 microns, the majority being in the 11 to 31 micron range.

Another feature of this invention is the ability to tailor the rheology of both the drilling fluid and the final cement to the conditions of a particular wellbore. This results from the fact that the use of slag as the hydraulic material gives a final cementitious slurry which is not weakened in the manner that would be the case with Portland cement if the slurry is more dilute. On the other hand, additional slag does not impart extremely high viscosity to the slurry and thus a higher concentration of hydraulic material can be used if desired.

DILUTION

However, in the preferred method of this invention, the drilling fluid is utilized and thereafter diluted prior to or during the addition of additional blast furnace slag. The dilution fluid can be the same as the liquid used to make the drilling fluid or it can be different. Generally, it will be brine, especially if the drilling fluid was made using brine. It can also be a more concentrated brine. In many instances, it is preferred that both the dilution fluid and the original liquid used to produce the initial drilling fluid be seawater. This is especially beneficial in offshore drilling applications where fresh water is not readily available and seawater is.

Thus, a significant improvement in the operating procedure is provided. This is because the density of the drilling fluid can be chosen in the first place to be sufficient to avoid inflow into the wellbore because of formation pressure but insufficient to rupture the wellbore wall and force fluid out into the formation. By utilizing the dilution and thereafter the addition of additional blast furnace slag, the cementitious slurry can also have the density tailored to the particular operation the same as the drilling fluid.

The dilution can be carried out in either of two ways. First, a vessel containing drilling fluid can simply be isolated and the desired amount of water or other diluent added thereto. In a preferred embodiment, however, the drilling fluid is passed to a mixing zone as a flowing stream and the dilution fluid added "on the fly" to the flowing stream. Thereafter, the additional blast furnace slag is added. This avoids highly viscous cementitious slurry compositions and allows all of the pumping to be done with piping and pumps associated with the well rig without the need for pumps designed for pumping cement. This is of particular value in the areas to which this invention is of special utility, offshore drilling rigs where the transportation of additional pumping equipment is particularly inconvenient. Thus, it is possible to tailor the final density of the cementitious slurry, if desired, to a value within the range of 30% less to 70% more than the original density of the drilling fluid, preferably within the range of 15% less to 50% more, most preferably essentially the same, i.e., varying by no more than ±5 weight percent.

The total amount of cementitious material present in the cementitious slurry generally ranges from about 20 lbs/bbl to about 600 lbs/bbl, preferably 100 lbs/bbl to 500 lbs/bbl, most preferably 150 lbs/bbl to 350 lbs/bbl. In a most preferred embodiment the hydraulic material is made up entirely, or essentially entirely, of blast furnace slag, no other hydraulic material being added.

In yet another related embodiment of this invention, universal fluid is utilized in a drilling operation and thereafter additional slag and/or additives are gradually added so as to gradually transition from a drilling fluid to a cementitious slurry.

This invention can even be used to drill extended reach slim hole wells which, themselves, present some of the same problems as slim hole wells generally because of uneven casing placement in the borehole.

The term 'extended reach drilling' is intended to encompass those techniques sometimes referred to as deviated drilling, horizontal drilling or directional drilling. The invention is applicable to those deviated wells where the deviation from vertical is as little as one percent since even this small deviation over the course of a wellbore causes difficulty in centering the casings. The other extreme would be a truly horizontal well which would be quite rare. The invention is of particular value in those wells having a deviation from vertical within the range of 1 to 90 degrees, preferably 10 to 90 degrees, most preferably 30 to 80 degrees.

MIXED METAL HYDROXIDES

In some instances, it is desirable to sequence the incorporation of ingredients. For instance, the slag may be introduced into the drilling fluid after the addition of thinners and/or retarders. This is particularly true if mixed metal hydroxides are used in the drilling fluid to impart thixotropic properties. In such instances, a thinner such as a lignosulfonate is preferably added before adding slag.

The mixed metal hydroxides provide better solids suspension. This, in combination with the settable filter cake provided in the technique of this invention, greatly enhances the cementing in a restricted annulus. The mixed metal hydroxides are particularly effective in muds containing clay such as sodium bentonite. Preferred systems thickened in this way contain from 1 to 20 lbs/bbl of clay such as bentonite, preferably 2 to 15 lbs/bbl, most preferably 7 to 12 lbs/bbl. The mixed metal hydroxides are generally present in an amount within the range of 0.1 to 2 lbs/bbl of total drilling fluid, preferably 0.1 to 1.5 lbs/bbl, most preferably 0.7 to 1.2 lbs/bbl. Mixed metal hydroxides are known in the art and are trivalent metal hydroxide-containing compositions such as $MgAl(OH)_{4.7}Cl_{0.3}$. They conform essentially to the formula

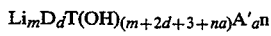
$$Li_mD_dT(OH)_{(m+2d+3+na)}A'_a{}^n$$

where m represents the number of Li ions present; the said amount being in the range of zero to about 1;

D represents divalent metals ions; with d representing the amount of D ions in the range of zero to about 4;

T represents trivalent metal ions;

A" represents monovalent or polyvalent anions of valence −n, other than $OH^-$, with a being the amount of A' anions; and where (m+2d+3+na) is equal to or greater than 3.

A more detailed description can be found in Burba, U.S. Pat. No. 4,664,843 (May 12, 1987). The mixed metal hydroxides in the drilling fluid in combination with blast furnace slag tend to set to a cement having considerable strength in a comparatively short time, i.e., about one-half hour at temperatures as low as 100° F. This can be a major asset in some applications.

CONVENTIONAL DRILLING FLUID ADDITIVES

Suitable fluid loss additives found in drilling fluids include bentonite clay, carboxymethylated starches, starches, carboxymethyl cellulose, synthetic resins such as "POLYDRILL" by SKW Chemicals, sulfonated lignite, lignites, lignin, or tannin compounds. Weight materials include barite, calcium carbonate, hematite and MgO, for example. Shale stabilizers that are used in drilling fluids include hydrolyzed polyacrylonitrile, partially hydrolyzed polyacrylamide, salts including Nacl, KCl, sodium or potassium formate, sodium or potassium acetate, polyethers and polycyclic and/or polyalcohols. Viscosifying additives can be used such as biopolymers, starches, attapulgite and sepiolite. Additives are also used to reduce torque. Suitable thinners such as chrome and chrome free lignosulfonates, sulfonated styrene maleic-anhydride and polyacrylate may also be used depending upon the mud type and mud weight. Lubricating additives include nonionic detergents and oil (diesel, mineral oil, vegetable oil, synthetic oil), for instance. Alkalinity control can be obtained with KOH, NaOH or CaO, for instance. In addition, other additives such as corrosion inhibitors, nut hulls etc. may be found in a typical drilling fluid. Of course, drill solids including such minerals as quartz and clay minerals (smectite, illite, chlorite, kaolinite, etc.) may be found in a typical mud.

ACTIVATION

After the completion of the drilling, the drilling fluid is activated. This can be done by adding activators as discussed in detail hereinbelow, by adding additional blast furnace slag, or both. Preferably, the activation is done by adding additional blast furnace slag and an accelerator. It is also within the scope of the invention for the cementitious slurry to comprise hydraulic materials other than blast furnace slag, for instance, pozzolans and other hydraulic materials can be present. By 'hydraulic material' is meant a material which, on contact with water and/or activators, hardens or sets into a solidified composition. The activator or activators can be added either with any other ingredients that are added before the additional blast furnace slag, with the additional blast furnace slag, or after the addition of the additional blast furnace slag.

In some instances, it may be desirable to use a material which functions as a retarder along with the activator because of the need for other effects brought about by the retarder. For instance, a chromium lignosulfonate may be used as a thinner along with the activator even though it also functions as a retarder.

As noted hereinabove, the activator can be nothing more than additional blast furnace slag in a concentration high enough to form a cementitious slurry. Blast furnace slag will eventually hydrolyze and form cement particularly if it is in a heated environment or if heat is applied to the wellbore to speed up the setting.

However, it is greatly preferred to utilize a combination of slag in an amount which represents the majority of the total slag in the cementitious composition (i.e., a majority of the total of the slag in the drilling fluid and the slag added to form the cementitious slurry) and a chemical activator. Suitable chemical activators include sodium silicate, sodium fluoride, sodium silicofluoride, magnesium silicofluoride, zinc silicofluoride, sodium carbonate, potassium carbonate, sodium hydroxide, potassium hydroxide, calcium hydroxide, sodium sulfate and mixtures thereof. A mixture of caustic soda (sodium hydroxide) and soda ash (sodium carbonate) is preferred because of the effectiveness and ready availability. When mixtures of alkaline agents such as caustic soda and soda ash are used the ratio can vary rather widely since each will function as an accelerator alone.

Preferably, about 1 to 20 lbs/bbl of caustic soda, more preferably 2 to 6 lbs/bbl of caustic soda are used in conjunction with from 2 to 50 lbs/bbl, preferably 7 to 21 lbs/bbl of soda ash. The references to "lbs/bbl" means pounds per barrel of final cementitious slurry.

FILTER CAKE SETTING

In yet another embodiment of this invention the drilling process is carried out as described hereinabove with a universal fluid to produce a borehole through a plurality of strata, thus laying down a filter cake. Prior to the cementing operation, an activator is passed into contact with the filter cake, for instance by circulating the activator down the drill string and up the annulus between the drill string and the filter cake, or else the drill string is removed and the casing inserted and the activator circulated down the casing and up the annulus. As used herein 'down' as it relates to a drill string or casing means in a direction toward the farthest reach of the borehole even though in rare instances the borehole can be disposed in a horizontal position. Similarly, 'up' means back toward the beginning of the borehole. Preferably, the circulation is carried out by using the drill string, this being the benefit of this embodiment of the invention whereby the filter cake can be "set" to shut off gas zones, water loss, or to shut off lost circulation in order to keep drilling without having to remove the drill string and set another string of casing. This can also be used to stabilize zones which may be easily washed-out (salt zones wherein the salt is soluble in water, for instance) or other unstable zones. After the drilling is complete the drilling fluid is then diluted, the drill string removed, and the cementing carried out as described hereinabove. This can be accomplished by circulating a separate fluid containing the activator or by adding an activator such as an alkali as described hereinabove to the drilling fluid.

Conventional spacers may be used in the above described sequence. Also, any leftover fluid having activators therein may be displaced out of the borehole by the next fluid and/or a spacer fluid and stored for subsequent use or disposal.

In this embodiment where the filter cake is "set", the activator can be any of the alkaline activators referred to hereinabove such as a mixture of sodium hydroxide and sodium carbonate.

EXAMPLE

A 13.9 lb/gal universal fluid (UF) was prepared using a 13.5 lb/gal mud having the following composition: 20 wt % salt (140,000 mg/l), 8–10 lbs/bbl bentonite, 4–6 lbs/bbl carboxymethyl starch, sold under the trade name "BIOLOSE" by Milpark, 0.5–1 lbs/bbl partially hydrolyzed polyacrylamide (PHPA), sold under the trade name "NEWDRIL", by Milpark, 1–1.25 lbs/bbl carboxymethyl cellulose (CMC), sold under the trade name "MILPAC" by Milpark, 30–70 lbs/bbl drill solids, 0–250 lbs/bbl barite, and 40 lbs/bbl of blast furnace slag sold under the trade name "NEWCEM" by Blue Circle Atlantic Company.

The universal fluid was designed to be a drilling fluid at temperatures 120° F. through 160° F. and to provide a settable filter cake for better zonal isolation and for protection of the formation. A full-scale horizontal wellbore model was used to test the hardening of this universal fluid. This universal fluid was tested to show that it and its filter cake would set up under downhole conditions.

The 13.9 lbs/gal universal fluid was circulated through the model and a filter cake was formed. A portion of the UF was then converted into a 15.4 lb/gal cement slurry by the addition of slag and activators as described hereinafter and the cement slurry was used to displace the universal fluid (UF) in the wellbore model. The wellbore model was heat aged at 200° F. for three weeks. The most important objective of this test was to deposit the UF in simulated washed-out sections and to show that undisplaced UF pockets can be set up in the worst possible physical conditions.

Test Objectives were: 1) Demonstrate that undisplaced pockets of the 13.9 lb/gal UF can set up under downhole conditions in order to eliminate unset fluids and filter cakes in the test model, 2) Demonstrate that the 13.9 lb/gal UF could be converted into a cement slurry with satisfactory slurry and set cement properties, 3) Demonstrate that a UF/cement slurry job can improve zonal isolation (improved shear and hydraulic bond in the model) and provide lateral casing support.

Test Conditions: Three washed-out sections (1", 2" and 6" wide) were specially built by modifying a synthetic wellbore model. The displacement test on the modified model was run based on the following field conditions:

UF Condition—Drilling a $10\frac{5}{8}$ in. deviated hole at borehole circulating temperature (BHCT) of 120° F. to 160° F.

Cement slurry Condition—Borehole static temperature (BHST) of 200° F. (18,000 ft.)

Displacement Model: A 5-inch outside diameter (OD), 18-ft long steel casing in a $6\frac{1}{2}$-inch inside diameter (ID) synthetic core simulating a formation with the 3 washed-out sections was used in a horizontal position using the following test conditions: 1) slow displacement rates (1 bpm) in order not to wash away the deposited filter cake and to preserve undisplaced UF in the washed-out sections, 2) 100% casing standoff.

The synthetic core (formation) was a $1\frac{3}{4}$-inch thick layer of a permeable sand-epoxy mix on the inner circumference of the model ($10\frac{3}{4}$-in. OD and 10-in. ID steel casing). Three washed out sections (sharp edged with no transition zones) were made by removing portions of the simulated sand-epoxy formation before welding the sections of the 15-ft total length steel casing together. The tops of the three wash-outs (1", 2" and 6" length) were placed at 5 feet, 7 feet, and 10 feet respectively from the bottom of the wellbore model. As mentioned earlier, the 5-in. OD steel casing was centralized inside the wellbore model leaving a theoretical annular clearance of $\frac{3}{4}$-inch except in the wash-outs where it was $2\frac{1}{2}$-inch wide.

The $\frac{3}{4}$-inch annular clearance simulates the narrow annulus in a slim hole well.

Deposition of filter cake: The above-described 13.9 lb/gal universal fluid was circulated for 2 hours through the water-saturated wellbore model at 3–4 bbl/min. The wellbore model was shut in, electrically heated to 140° F., and pressurized. Filtrate was collected at a pressure differential of 100 psi to build a thick filter cake approximately $\frac{1}{8}$th-inch thick on the core.

Displacement: After the overnight filtering period at 140° F., the UF was circulated through the wellbore model at 1 bpm for 20 minutes while collecting additional filtrate. During the time of circulation, a 5-bbl batch of UF was isolated from the active mud (UF) system and converted it into a 200 lb/bbl cement slurry by adding additional 160 lb/bbl "NEWCEM" brand slag, activators and a retarder. The cement slurry was then dyed by adding 2.5 lb/bbl red iron oxide. The activator system was made up of 4 lb/bbl caustic soda, 14 lb/bbl soda ash and 6 lb/bbl "SPERCENE CF" (chrome lignosulfonate manufactured by M-I Drilling Fluids). The UF was displaced out of the wellbore model with the dyed cement slurry at 1–2 bbl/min until the initial portion of uncontaminated cement slurry was noted at the discharge. The slow displacement was not sought in order to leave substantial amounts of undisplaced UF in the model. The cement slurry was then circulated through the wellbore model for an additional 20 minutes at 1–2 bbl/min.

Evaluation of Core: After a three-week aging period at 200° F., the wellbore model was allowed to cool to room temperature. The model was then disassembled and sawed into three sections. These sections were again sawed into smaller sections for further shear and hydraulic bond tests.

All the available cross sections were photographed for estimating displacement efficiency. As planned, the displacement efficiency was about 55%. The expected poor displacement efficiency of the washed-out model was accentuated by the high angle of the wellbore model. Although the casing was centralized, a perfect centralization was not obtained. Much of the UF was not displaced out of the narrow side of the annulus. By 'displacement efficiency' is meant the volume of mud removed divided by the volume of the annulus times 100 to convert to percent.

Thus, this example demonstrates the value of the invention in a narrow annulus such as is found in a slim hole well.

The presence of undisplaced UF was evident all the way from one end to the other end, especially on the bottom side. Even so, the UF filter cakes and undisplaced UF pockets were found to be very hard. A hand held penetrometer test indicates that the UF filter cakes and cement slurry had compressive strengths in excess of 750 psi (maximum reading). In essence, an excellent cement job was obtained in spite of the slow pumping rates, high angle (90°) of the hole and presence of the three wash-outs. The cement job would have been very poor with a displacement efficiency of 55% if the universal fluid/cement slurry had not been used.

Blocks containing the washed-out portions of the model were sawed and further evaluated. Lengthwise diamond saw cuts were made to produce parallel faced slices about 1¼-inch to 1¾-inch thick. These slices exposed the newly cut cross sections of the formation, the annulus, the wash-outs and the hardened UF, UF filter cake, and the cement slurry.

Hardened UF and UF filter cake were found in the 1-inch wash-out, at the base of the 2-inch wash-out, and at the base corners of the 6-inch wash-out. The increased hardness near the permeable formation faces in the wash-outs is caused by the concentration of the UF by fluid loss. The hardened universal fluids showed a compressive strength between about 500 and 1,500 psi. Although there were various lamination in the samples, the annulus and washed-out sections were completely cemented and the overall zonal isolation was excellent.

Additionally, 8 slag cement slurry samples were taken during the displacement and cured in 2-inch cube molds at 200° F. for one week. An average compressive strength of 1,874 psi with a standard deviation of 204 psi was obtained.

Hydraulic Bond Test Results: The top section (4.5-ft long) was cut into two smaller sections. In-situ hydraulic bond tests were conducted on these cores (2.25-ft long) using a fluorescent dyed water. Two taps (front and back) were drilled to the casing on the core and nipples were installed using epoxy resin. Dyed water was pumped through the nipples using an hydraulic pump and maximum breakdown pressures were recorded as hydraulic bond strength. The test results were as follows:

| Core/Pressure Tap | Hydraulic Bond, psi |
|---|---|
| H-1, Front | 1,800 |
| H-1, Back | 400 |
| H-2, Front | 550 |
| H-2, Back | 750 |

Shear Bond Test Results: The two bottom sections of the model (4.5-ft long) were cut into 5 pieces for shear bond tests. The sections containing the wash-outs were excluded from the shear bond tests. Shear bond was measured by pressing out the casing on a hydraulic press. The test results were as follows:

| Sample ID | Pipe Length (in.) | Force (lbs) | Shear Bond (psi) |
|---|---|---|---|
| S-1 | 10.175 | 4,140 | 26.2 |
| S-2 | 9.0 | 19,200 | 135.38 |
| S-3 | 8.5 | 1,700 | 12.7* |
| S-4 | 10.5 | 10,200 | 60.8 |
| S-5 | 10.675 | 5,360 | 32.0 |
| S-6 | 10.875 | 4,960 | 29.1 |
| S-7 | 10.75 | 1,580 | 9.4* |
| S-8 | 8.675 | 2,000 | 14.7* |

*Specimens appeared damaged during sawing the core.

In addition, 4 slag cement slurry samples were taken during the displacement and cured in laboratory shear bond molds with a steel pipe having a dimension of 4-in. length and 1.5-in. OD at 200° F. for one week. An average shear bond was 46.5 psi.

Conclusions: The undisplaced pockets of the universal fluid were set hard with a compressive strength between 500 and 1,500 psi. Excellent hydraulic bond data were obtained. Although varied, shear bond data are very good. It is demonstrated that (1) a blast furnace slag universal fluid can achieve a 100% displacement efficiency by eliminating unset pockets of mud even in a narrow annulus, (2) a blast furnace slag universal fluid can improve a lateral support of casing by eliminating unset materials and providing additional strength through solidification of those portions which otherwise would be unset, (3) a blast furnace slag universal fluid can improve zonal isolation through improving shear and hydraulic bonds, and (4) a high density blast furnace slag universal fluid can be formulated and utilized at elevated temperatures.

Two UCA cells with the 15.4 lb/gal slag cement slurry sample caught during the displacement were run at 200° F. Additional tests were run with the slag cement slurry sample to obtain rheology, density, API fluid loss, and free water data. The test results of the 15.4 lb/gal slag cement slurry are summarized in the following table.

| FORMULATION: | |
| --- | --- |
| 1 bbl Mud + 4 lbs NaOH + 14 lbs Na$_2$CO$_3$ + 8 lbs "SPERCENE" brand chromium lignosulfonate + 200 lbs "NEWCEM" brand blast furnace slag | |
| SLAG CEMENT SLURRY PROPERTIES: | |
| Plastic Viscosity = | 14 cp |
| Yield Point = | 10 lb/100 ft.$^2$ |
| Gel Strength, 10 sec/10 min = | 8/36 lb/100 ft.$^2$ |
| API Fluid Loss = | 4.9 cm$^3$ |
| High Temperature Fluid Loss = | 24 cm$^3$ at 160° F. |
| Free Water = | 0 cm$^3$ |
| Thickening Time = | 7:43 hrs at 170° F. |
| SLAG CEMENT SET STRENGTHS after CURING AT 200° F. | |
| Compressive Strength = | 2,200 + psi |
| Shear Bond = | 30–135 psi |
| Hydraulic Bond = | 400–1,800 psi |

While this invention has been described in detail for the purpose of illustration, it is not to be construed as limited thereby but is intended to cover all changes and modifications within the spirit and scope thereof.

What is claimed is:

1. A method comprising:
   drilling a slim hole wellbore with a drill string comprising a drill pipe utilizing a drilling fluid comprising granulated water-quenched blast furnace slag and water;
   circulating said drilling fluid down said drill pipe and up an annulus between said drill pipe and walls of said wellbore, thus laying down a filter cake on said walls of said wellbore during said drilling;
   withdrawing said drill string and inserting a casing, thus creating an annulus having a dimension between 0.1 and 1.25 inches between said casing and said walls of said wellbore;
   adding an activator to said drilling fluid to produce a cementitious slurry; and
   circulating said cementitious slurry down said casing and up into said annulus between said casing and said walls of said wellbore.
2. A method according to claim 1 wherein said activator is additional blast furnace slag and alkaline agent.
3. A method according to claim 2 wherein said alkaline agent is a mixture of caustic soda and soda ash.
4. A method according to claim 3 wherein said drilling fluid comprises, in addition, a lignosulfonate thinner.
5. A method according to claim 2 wherein said drilling fluid contains from 20 to 50 lbs/bbl of said blast furnace slag and wherein said additional blast furnace slag is added in forming said cementitious slurry in an amount sufficient to give a total amount of cementitious material in said cementitious slurry within the range of 100 to 500 lbs/bbl.
6. A method according to claim 5 wherein said blast furnace slag represents the only hydraulic component in said cementitious slurry.
7. A method according to claim 2 wherein said slag of said drilling fluid and said slag of said activator each are made up of a mixture of 5–25wt % ultrafine ground slag and 80–95wt % of fine or microfine ground slag.
8. A method according to claim 1 wherein said water contains dissolved salts.
9. A method according to claim 8 wherein said dissolved salts comprise sodium chloride.
10. A method according to claim 9 wherein said sodium chloride is present in an amount within the range of 0.2 to 5 wt %.
11. A method according to claim 8 wherein said water comprises sea water.
12. A method according to claim 1 wherein said drilling fluid contains, in addition, a polycyclicpolyetherpolyol.
13. A method according to claim 1 wherein said borehole has a diameter within the range of 4 to 6 inches and said annulus has a dimension within the range of 0.25 to 1.25 inches.
14. A method according to claim 1 wherein said drilling fluid contains clay and a mixed metal hydroxide thixotropic agent.
15. A method according to claim 14 wherein said clay is bentonite and said mixed metal hydroxide is MgAl(OH)$_{4.7}$Cl$_{0.3}$, wherein a lignosulfonate thinning agent is added prior to adding said activator, and wherein said activator comprises additional blast furnace slag and an alkaline agent.
16. A method according to claim 1 wherein:
   prior to said withdrawing of said drill string, an activator is passed down said drill pipe and up into contact with said filter cake, thus causing setting of said filter cake; and
   thereafter additional drilling is carried out.
17. A method for drilling a slim hole well comprising:
   drilling a borehole with a rotary drill comprising a drill pipe and a bit;
   utilizing a drilling fluid comprising 20–50 lbs/bbl of granulated water-quenched blast furnace slag, clay, starch, partially hydrolyzed polyacrylamide, and barite;
   circulating said drilling fluid down said drill pipe and up an annulus between said pipe and the walls of said borehole thus laying down a filter cake on said walls of said borehole;
   withdrawing said rotary drill and inserting a casing, thus creating an annulus between said casing and said walls of said borehole having a dimension between 0.1 and 1.25 inches;
   adding blast furnace slag, a lignosulfonate thinner, and an activator comprising a mixture of caustic soda and soda ash to said drilling fluid to produce a cementitious slurry having a total amount of blast furnace slag within the range of 100 to 500 lbs/bbl; and
   passing said cementitious slurry down through said casing and up into said annulus formed by said casing and said walls of said borehole.

* * * * *